(12) United States Patent
MacKay et al.

(10) Patent No.: US 9,003,542 B1
(45) Date of Patent: Apr. 7, 2015

(54) SYSTEMS AND METHODS FOR REPLACING SENSITIVE INFORMATION STORED WITHIN NON-SECURE ENVIRONMENTS WITH SECURE REFERENCES TO THE SAME

(75) Inventors: Paul F. MacKay, Provo, UT (US); Randall R. Cook, Mapleton, UT (US); Bill G. Bodine, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 236 days.

(21) Appl. No.: 12/966,307

(22) Filed: Dec. 13, 2010

(51) Int. Cl.
  *G06F 21/60* (2013.01)
  *G06F 21/50* (2013.01)
  *G06F 21/00* (2013.01)
  *H04W 12/02* (2009.01)

(52) U.S. Cl.
  CPC ...................... *G06F 21/50* (2013.01)

(58) Field of Classification Search
  CPC . G06F 21/60; G06F 21/00; G06F 2221/2143; G06F 21/6254; G06F 21/88; G11B 19/122; H04W 12/02
  USPC .......................................................... 726/26
  See application file for complete search history.

(56) References Cited

U.S. PATENT DOCUMENTS

| | | | |
|---|---|---|---|
| 7,127,477 B2 * | 10/2006 | Duncombe et al. | 709/238 |
| 7,181,580 B2 | 2/2007 | Erickson et al. | |
| 7,197,638 B1 * | 3/2007 | Grawrock et al. | 713/165 |
| 8,108,641 B2 * | 1/2012 | Goss et al. | 711/163 |
| 8,249,654 B1 * | 8/2012 | Zhu | 455/558 |
| 8,689,349 B2 * | 4/2014 | Sahita et al. | 726/27 |
| 2003/0009430 A1 * | 1/2003 | Burkey et al. | 707/1 |
| 2007/0094390 A1 * | 4/2007 | Nussey | 709/225 |
| 2010/0042583 A1 * | 2/2010 | Gervais et al. | 707/3 |

OTHER PUBLICATIONS

John Kubiatowicz; OceanStore: Global-Scale Persistent Storage; Stanford Seminar Series; 2001.

* cited by examiner

*Primary Examiner* — Michael Chao
*Assistant Examiner* — Shiuh-Huei Ku
(74) *Attorney, Agent, or Firm* — ALG Intellectual Property, LLC (57) ABSTRACT

A computer-implemented method for replacing sensitive information stored within non-secure environments with secure references to the same may include (1) identifying sensitive information stored within a non-secure environment on a computing device, (2) removing the sensitive information from the non-secure environment, (3) storing the sensitive information within a secure environment, (4) replacing the sensitive information originally stored within the non-secure environment with a reference that identifies the sensitive information stored within the secure environment, (5) identifying a request to access at least a portion of the sensitive information identified in the reference, (6) determining that at least a portion of the request satisfies a data-loss-prevention policy, and then (7) providing access to at least a portion of the sensitive information via the secure environment. Various other systems, methods, and computer-readable media are also disclosed.

20 Claims, 8 Drawing Sheets

SYSTEMS AND METHODS FOR REPLACING SENSITIVE INFORMATION STORED WITHIN NON-SECURE ENVIRONMENTS WITH SECURE REFERENCES TO THE SAME

BACKGROUND

Individuals and entities increasingly share, access, and disseminate high volumes of electronic information. Moreover, the ubiquity of high-speed Internet access, smart mobile devices, and portable storage has lead to an increasingly mobile workforce. As a consequence, it has become more difficult than ever for organizations to prevent sensitive information from being lost and/or compromised.

Unfortunately, many devices (including a variety of smartphones and other mobile devices) do not provide a way for native applications to handle sensitive information in a secure way. For example, many native applications on mobile devices (such as the built-in calendar, email, contact, and note applications on many popular smartphones) fail to provide means for encrypting or otherwise protecting information input into, or viewed or accessed by, such applications. As a result, information input into or accessed by such applications may be compromised if the device and/or application in question is ever cracked or otherwise illegitimately accessed. As such, the instant application identifies a need for systems and methods for securely inputting sensitive information into (and accessing sensitive information from) such native applications without compromising the security of the sensitive information in question.

SUMMARY

As will be described in greater detail below, the instant disclosure generally relates to systems and methods for securely inputting sensitive information into (and securely accessing sensitive information from) non-secure applications or environments without compromising the security of the sensitive information in question. In one example, the systems described herein may accomplish such a task by (1) identifying sensitive information stored within a non-secure environment on a computing device (such as a mobile application that caches or stores information in plaintext), (2) removing the sensitive information from the non-secure environment and storing the same within a secure environment, and then (3) replacing the sensitive information originally stored within the non-secure environment with a reference or pointer that identifies or points to the sensitive information stored within the secure environment. When a request to access the sensitive information is detected (e.g., when a user selects the reference inserted in place of the sensitive information within the non-secure environment), the systems described herein may then (1) determine whether at least a portion of the request satisfies a data-loss-prevention policy and, if so, (2) provide access to at least a portion of the sensitive information via the secure environment (by, e.g., providing a secure viewer for securely viewing and/or editing the sensitive information).

The reference may identify the sensitive information in a variety of ways, including through the use of text, graphics, and/or colors. In some embodiments, the reference may identify or reference the location of the sensitive information using a Uniform Resource Identifier (URI), the Simple Object Access Protocol (SOAP), an event notification, or the like. In some examples, the reference may contain information sufficient to identify and/or describe the sensitive information in question without actually disclosing any of the sensitive information.

In some examples, the systems described herein may vary the amount and/or type of information contained within the reference based on one or more characteristics of the sensitive information and/or the computing device. Examples of such characteristics include temporal characteristics (e.g., whether the time of day currently falls within normal business hours), geolocation characteristics (such as whether the computing device is currently located on company property or in a public location, such as an airport), characteristics of an application responsible for creating or storing the information (such as whether an application responsible for creating the information has been verified or signed, whether a vendor of the application is trusted, or the like), characteristics of a user responsible for creating or storing the information (such as whether the user represents a company executive or senior engineer), or any other potentially relevant characteristic. In one embodiment, the systems described herein may modify (e.g., in real-time) the amount and/or type of information contained within the reference based on such characteristics.

The systems described herein may also vary the amount and/or type of access granted to the sensitive information based on one or more of characteristics of the request. Examples of such characteristics include temporal characteristics (e.g., whether the request originated during normal business hours), geolocation characteristics (such as whether the request originated from a secure location, such as company property), characteristics of an application responsible for the request (such as whether the request originated from an application that has been verified and/or signed by a trusted vendor), or any other potentially relevant characteristic. As with the reference described above, in some examples the systems described herein may modify (e.g., in real-time) the amount and/or type of access granted to the sensitive information based on such characteristics.

As will be explained in greater detail below, by replacing sensitive information stored within non-secure environments with secure references or pointers to the same, the systems and methods described herein may enable users of non-secure applications (such as mobile applications that cache or store information in plaintext) to securely input sensitive information into (and securely access sensitive information from) such applications without compromising the security of the sensitive information in question.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
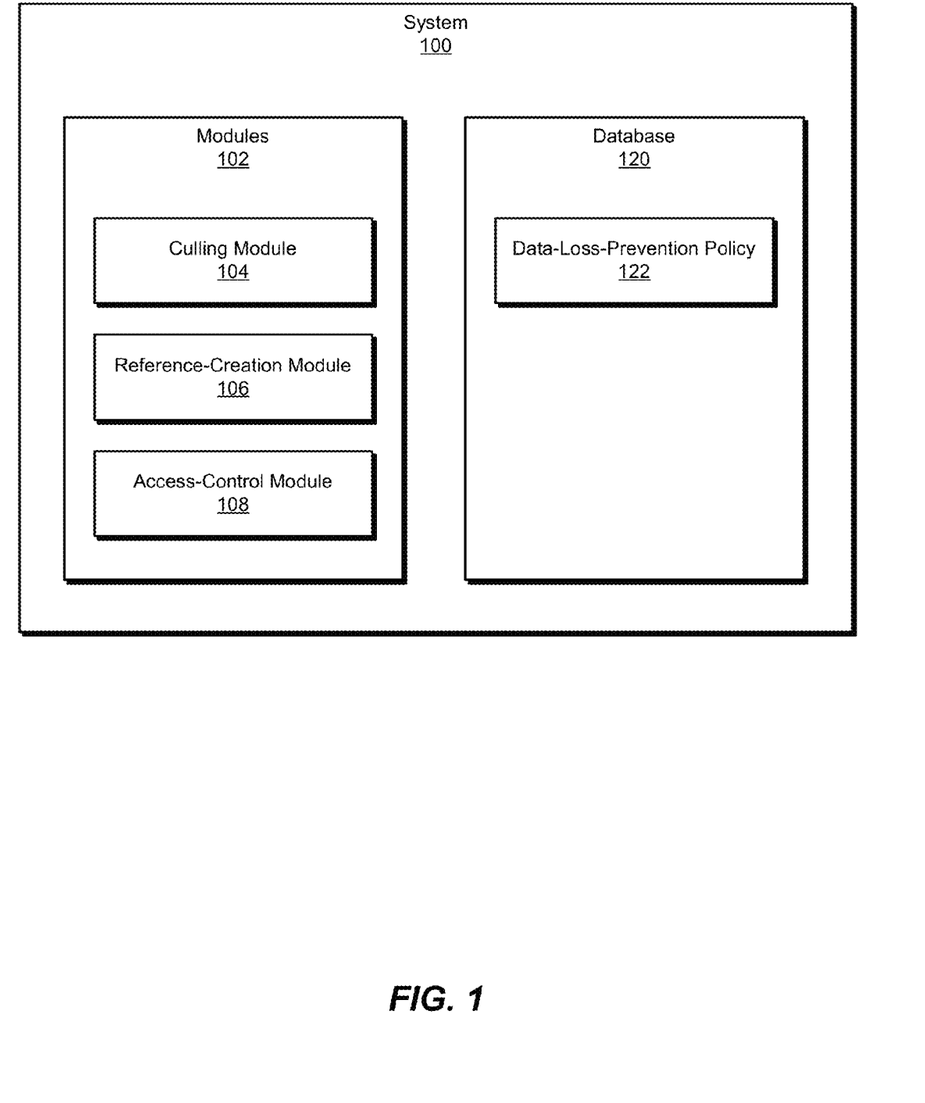
FIG. 1 is a block diagram of an exemplary system for replacing sensitive information stored within non-secure environments with secure references to the same.
Figure 2:
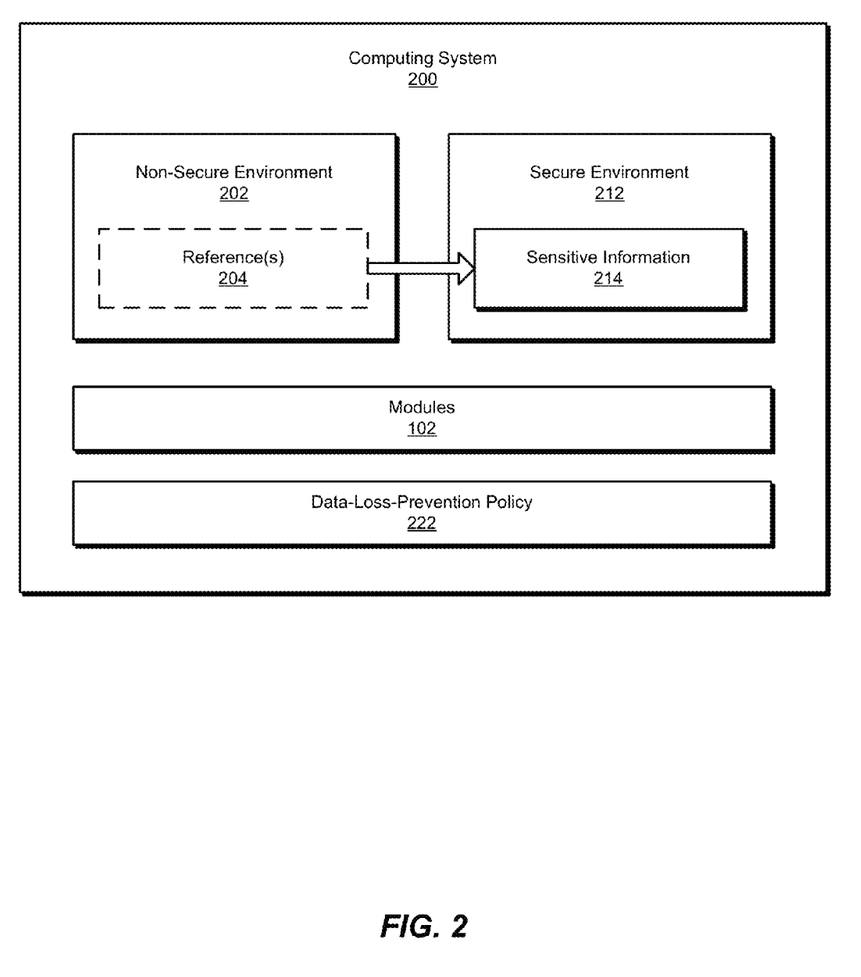
FIG. 2 is a block diagram of an exemplary system for replacing sensitive information stored within non-secure environments with secure references to the same.

The following will provide, with reference to FIGS. 1-2, detailed descriptions of exemplary systems for replacing sensitive information stored within non-secure environments with secure references to the same. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for replacing sensitive information stored within non-secure environments with secure references to the same. As illustrated in this figure, exemplary system 100 may include one or more modules 102 for performing one or more tasks. For example, and as will be explained in greater detail below, exemplary system 100 may include a culling module 104 programmed to identify and remove sensitive information from non-secure environments. Exemplary system 100 may also include a reference-creation module 106 programmed to replace sensitive information originally stored in non-secure environments with secure references to the same.

In addition, and as will be described in greater detail below, exemplary system 100 may include an access-control module 108 programmed to control access to sensitive information stored within secure environments in accordance with various data-loss-prevention policies. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 200), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, and as will be explained in greater detail below, database 120 may include one or more data-loss-prevention policies 122. Database 120 may represent portions of a single database or computing device or a plurality of databases or computing devices. For example, database 120 may represent a portion of computing system 200 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing system 200 in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of exemplary computing system 200 in FIG. 2. In one embodiment, and as will be described in greater detail below, modules 102 may program computing system 200 to replace information stored within non-secure environments with secure references to the same by (1) identifying sensitive information (such as sensitive information 214) stored within a non-secure environment (such as non-secure environment 202) on computing system 200, (2) removing the sensitive information from the non-secure environment and storing the same within a secure environment (such as secure environment 212), and then (3) replacing the sensitive information originally stored within the non-secure environment with a reference or pointer (such as reference 204) that identifies or points to the sensitive information stored within the secure environment. Modules 102 may also program computing system 200 to detect requests to access the sensitive information (initiated, e.g., when a user selects the reference inserted in place of the sensitive information within the non-secure environment). Upon detecting such a request, modules 102 may program computing system 200 to (1) determine whether at least a portion of the request satisfies a data-loss-prevention policy (such as data-loss-prevention policy 222) and, if so, (2) provide access to at least a portion of the sensitive information via the secure environment (by, e.g., providing a secure viewer for securely viewing and/or editing the sensitive information).

Computing system 200 generally represents any type or form of computing or system device capable of reading computer-executable instructions. Examples of computing system 200 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Figure 3:
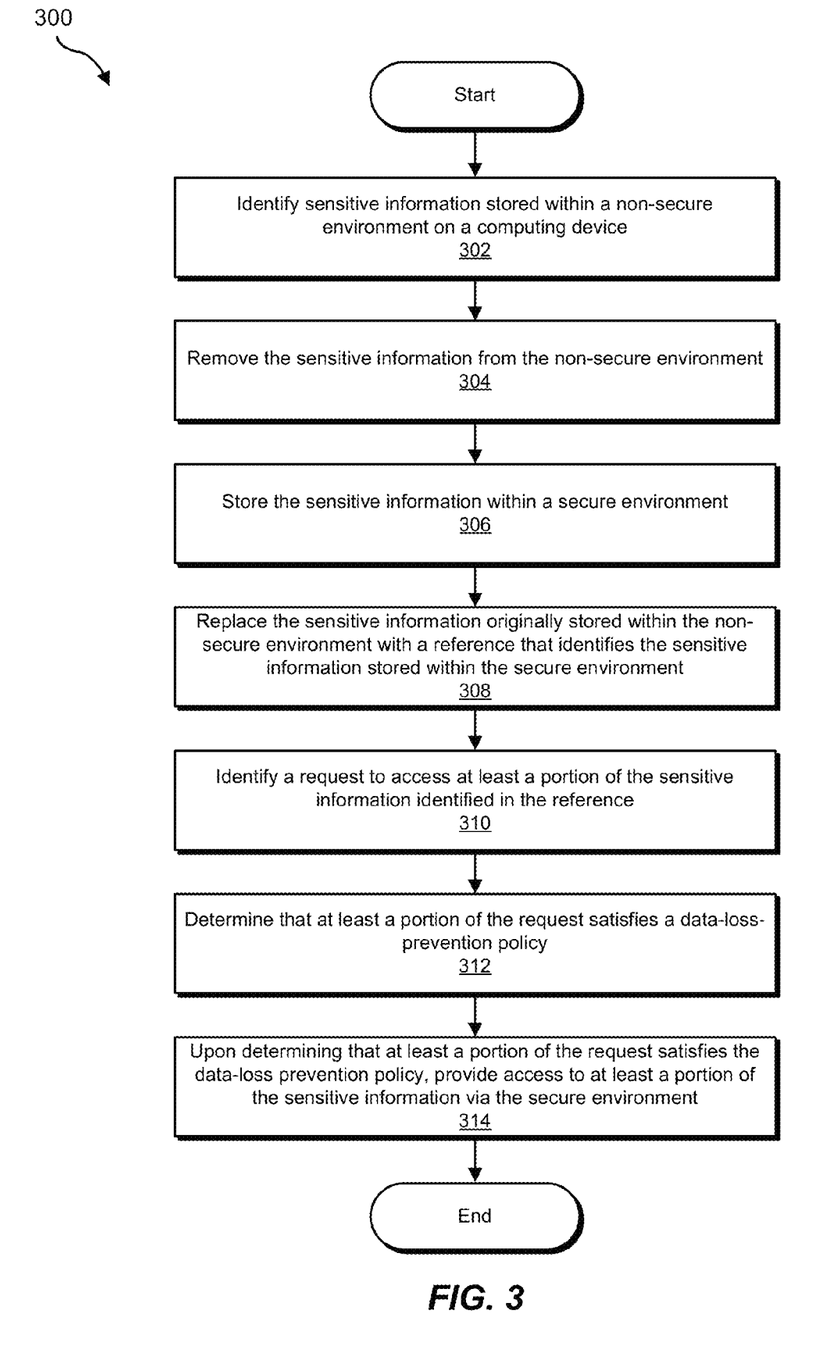
FIG. 3 is a flow diagram of an exemplary method for replacing sensitive information stored within non-secure environments with secure references to the same.

FIG. 3 is a flow diagram of an exemplary computer-implemented method 300 for replacing sensitive information stored within non-secure environments with secure references to the same. The steps shown in FIG. 3 may be performed by any suitable computer-executable code and/or computing system. In some embodiments, the steps shown in FIG. 3 may be performed by one or more of the components of system 100 in FIG. 1, computing system 200 in FIG. 2, computing system 710 in FIG. 7, and/or portions of exemplary network architecture 800 in FIG. 8.

As illustrated in FIG. 3, at step 302 the systems described herein may identify sensitive information stored within a non-secure environment on a computing device. For example, culling module 104 may, as part of computing system 200 in FIG. 2, identify sensitive information 214 stored within non-secure environment 202.

As used herein, the term "sensitive information" may refer to information that, if revealed or disclosed to untrusted individuals or entities, may result in the loss of an advantage or level of security. As will be explained in greater detail below, examples of sensitive information may include, without limitation, personal information (e.g., information about a private individual, such as an individual's name, age, gender, and contact information), private information (e.g., information associated with a private individual that, if disclosed, may harm the individual's interests, such as an individual's Social Security number or credit card number), confidential business information (e.g., trade secrets, sales and marketing plans, pricing information, and financial data), or any other information that an individual or entity may wish to protect or keep private.

In addition, the term "non-secure environment," as used herein, may refer to any type or form of environment in which data is stored or accessed in an unprotected manner. Examples of non-secure environments include, without limitation, mobile applications (such as calendar applications, email applications, contact applications, note applications, or the like) that cache or store data in an unsecured manner or format (e.g., plaintext).

The systems described herein may perform step 302 in a variety of ways. In one example, culling module 104 may scan computing system 200 for information stored in a non-secure manner that triggers a data-loss-prevention policy, such as data-loss-prevention policy 222. The term "data-loss-prevention policy" may refer to a policy and/or rule that describes, defines, or otherwise identifies content that an organization desires to protect. Data-loss-prevention policies may be configured in a variety of ways and formats. For example, a data-loss-prevention policy may include signatures (such as hashes) of sensitive information to be protected (such as keywords, phrases, expressions, partial or full documents, or the like). Additionally or alternatively, a data-loss-prevention policy may include the sensitive information itself.

In some examples, a data-loss-prevention policy may include rules for identifying sensitive information based on one or more characteristics of the information to be protected. For example, a data-loss-prevention policy may determine that information stored within a non-secure environment on a computing device represents sensitive information that is to be protected if the information satisfies one or more criteria relating to various predetermined attributes or characteristics, including temporal characteristics of the information (such as when the information was created or last modified), geolocation characteristics of the information (such as whether the information was created on company property or in a public location, such as an airport), characteristics of an application responsible for creating or storing the information (such as whether an application responsible for creating the information has been verified or signed, whether a vendor of the application is trusted, or the like), characteristics of a user responsible for creating or storing the information (such as whether the user represents a company executive or senior engineer), characteristics of a file containing the information (e.g. file type), or any other characteristic that may be useful in determining whether the information represents information that should be protected.

Data-loss-prevention policies may be generated or developed in a variety of ways. In some examples, data-loss-prevention policies may be generated using a variety of heuristics and/or machine-learning techniques. For example, a data-loss-prevention policy containing rules for identifying sensitive information may be developed by training a decision tree using a corpus of samples that includes known-sensitive information and known non-sensitive information.

Returning to FIG. 3, at step 304 the systems described herein may remove the sensitive information from the non-secure environment. For example, culling module 104 may, as part of computing system 200 in FIG. 2, remove sensitive information 214 from non-secure environment 202.

Figure 4:
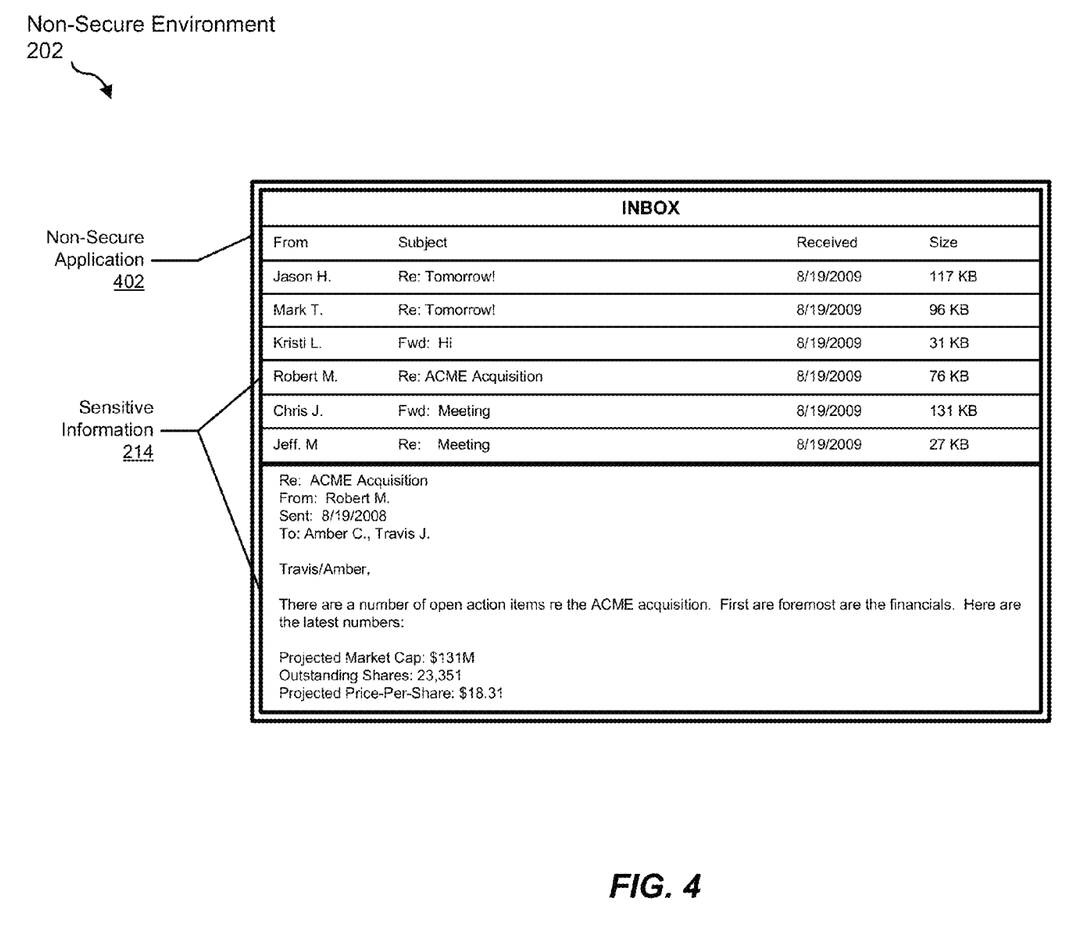
FIG. 4 is an illustration of an exemplary non-secure environment containing sensitive information.
Figure 5:
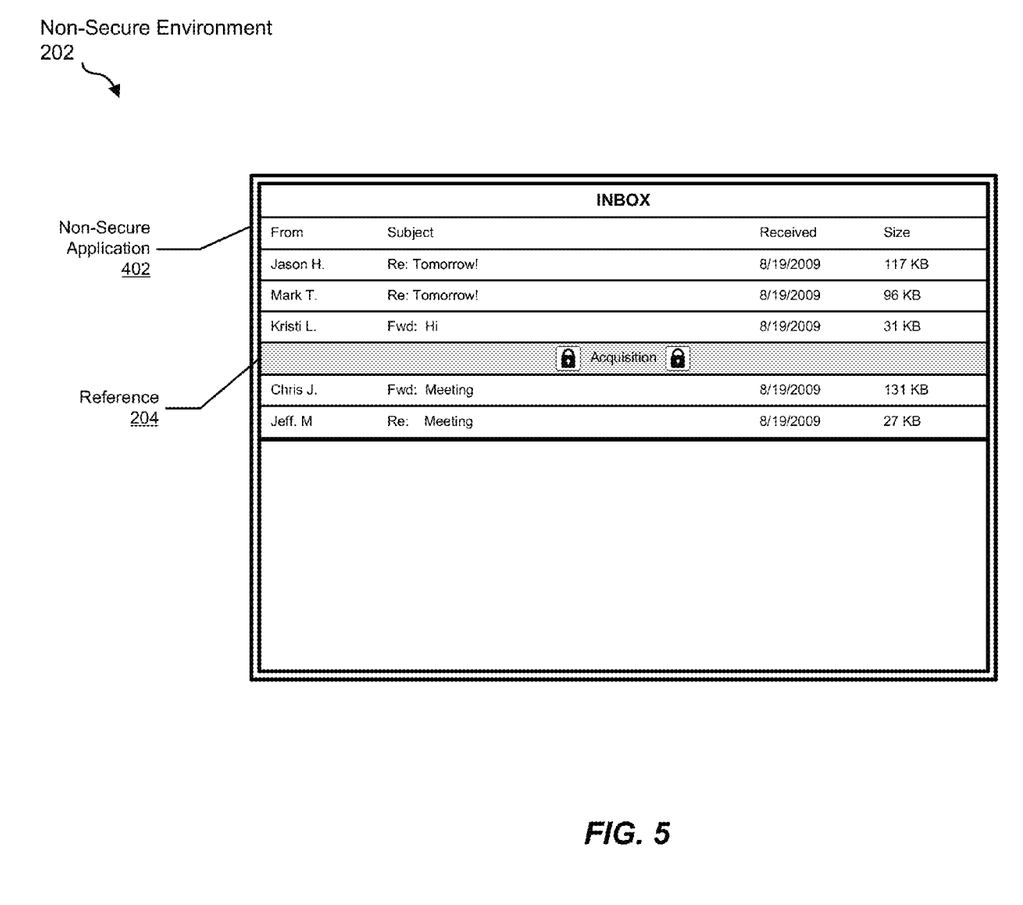
FIG. 5 is an illustration of an exemplary non-secure environment in which sensitive information has been replaced with a secure reference to the same.

The systems described herein may perform step 304 in a variety of ways. In one example, the systems described herein may simply delete the sensitive information from the non-secure environment. For example, culling module 104 may delete sensitive information 214 from non-secure application 402, as illustrated in FIGS. 4 and 5.

Returning to FIG. 3, at step 306 the systems described herein may store the sensitive information within a secure environment. For example, culling module 104 may, as part of computing system 200 in FIG. 2, store the sensitive information 214 removed from non-secure environment 202 within secure environment 212.

The term "secure environment," as used herein, may refer to an environment in which data is stored in a protected manner or format. In some examples, a secure environment may protect data using various encryption technologies, trusted hardware platforms, and/or virtualization technologies. Secure environments may be implemented locally (using, e.g., hardware and/or storage devices contained within the computing device in question) and/or remotely (using, e.g., remote hardware and/or storage devices, such as a remote authentication server).

At step 308, the systems described herein may replace the sensitive information originally stored within the non-secure environment with a reference that identifies the sensitive information stored within the secure environment. For example, reference-creation module 106 may, as part of computing system 200 in FIG. 2, replace sensitive information 214 originally stored within non-secure environment 202 with a reference 204 that identifies the sensitive information 214 now stored within secure environment 212.

The reference created in step 308 may identify the sensitive information removed in step 304 in a variety of ways, including through the use of text, graphics, and/or colors. In some embodiments, the reference may identify or reference the location of the sensitive information using a Uniform Resource Identifier (URI), the Simple Object Access Protocol (SOAP), an event notification, or the like. In some examples, this reference may contain information sufficient to identify and/or describe the sensitive information in question without actually disclosing any of the sensitive information that is to be protected. For example, reference-creation module 106 may replace sensitive information 214 in FIGS. 4 and 5 (which, in this example, represents an email concerning a confidential company acquisition) with a reference 204 to the same that contains a contextual non-sensitive description of the removed information (in this example, the brief descriptor "Acquisition").

The systems described herein may perform step 308 in a variety of ways. In one example, the systems described herein may automatically generate the reference based on at least one characteristic of the sensitive information in accordance with a data-loss-prevention policy. In this example, the data-loss-prevention policy may contain various rules, heuristics, and/or machine-learning techniques for generating references to sensitive information that provide sufficient information to identify the sensitive information in question without actually disclosing any of the sensitive information that is to be protected.

In some examples, the systems described herein may vary the amount and/or type of information contained within the reference based on one or more characteristics of the sensitive information and/or the computing device. For example, the amount and/or type of information provided within reference 204 in FIGS. 4 and 5 may vary based on, for example, temporal characteristics (e.g., whether the time of day currently falls within normal business hours), geolocation characteristics (such as whether the computing device is currently located on company property or in a public location, such as an airport), characteristics of an application responsible for creating or storing the information (such as whether an application responsible for creating the information has been verified or signed, whether a vendor of the application is trusted, or the like), characteristics of a user responsible for creating or storing the information (such as whether the user represents a company executive or senior engineer), or any other potentially relevant characteristic.

For example, if reference-creation module 106 determines that computing system 200 is currently located in a relatively unsecure location (such as an airport), then reference-creation module 106 may only include a limited amount of descriptive information within reference 204 (e.g., "Acquisition" or "CONFIDENTIAL"). Alternatively, if reference-creation module 106 determines that computing system 200 is currently located in a relatively secure location (such as company property), then reference-creation module 106 may include an increased amount of descriptive information within reference 204 (e.g., "Acquisition of ACME Corp.").

In some examples, if reference-creation module 106 determines or detects that one or more characteristics of the sensitive information in question has changed, then reference-creation module 106 may modify (e.g., in real-time) the amount and/or type of information contained within the reference based on the changed characteristics in accordance with a data-loss-prevention policy. For example, if reference-creation module 106 determines that computing system 200 has been transported from a relatively unsecure location (such as an airport) to a relatively secure location (such as company property), then reference-creation module may expand the amount of information included within reference 204 in FIGS. 4 and 5 (by, e.g., expanding reference 204 from "Acquisition" to "Acquisition of ACME Corp.").

Returning to FIG. 3, at step 310 the systems described herein may identify a request to access at least a portion of the sensitive information identified by the reference created in step 308. For example, access-control module 108 may, as part of computing system 200 in FIG. 2, identify an attempt to access sensitive information 214 identified by reference 204.

The systems described herein may perform step 310 in a variety of ways. In one example, access-control module 108 may detect that a user or application has selected a reference (such as reference 204) that points to the sensitive information in question (e.g., when a user selects or clicks a reference or pointer inserted in place of sensitive information within a non-secure environment). In another example, access-control module 108 may identify an attempt by an application or computing resource to directly access sensitive information 214 stored within secure environment 212.

At step 312, the systems described herein may determine that at least a portion of the request satisfies a data-loss-prevention policy. For example, access-control module 108 may, as part of computing system 200 in FIG. 2, determine that at least a portion of the request identified in step 310 satisfies data-loss-prevention policy 222.

In some examples, data-loss-prevention policy may contain various criteria for evaluating requests to access sensitive information. Examples of the types of criteria included within data-loss-prevention policies that may be used to evaluate requests include, without limitation, criteria relating to a temporal characteristic of a request (e.g., whether the request originated during business hours), criteria relating to an application associated with the request (e.g., whether the requesting application has been verified and/or signed and/or whether a vendor of the requesting application is trusted), criteria relating to security credentials associated with the request (e.g., whether the request contains or includes the requisite user, device, and/or application credentials), criteria relating to a geolocation associated with the request (e.g., whether the request originated from a secure location, such as company property), or any other criteria that may be relevant to evaluating the propriety of a request to access sensitive information.

Returning to FIG. 3, at step 314 the systems described herein may, upon determining that at least a portion of the request satisfies the data-loss-prevention policy in step 312, provide access to at least a portion of the sensitive information via the secure environment. For example, access-control module 108 may, as part of computing system 200 in FIG. 2, provide access to sensitive information 214 via secure environment 212.

Figure 6:
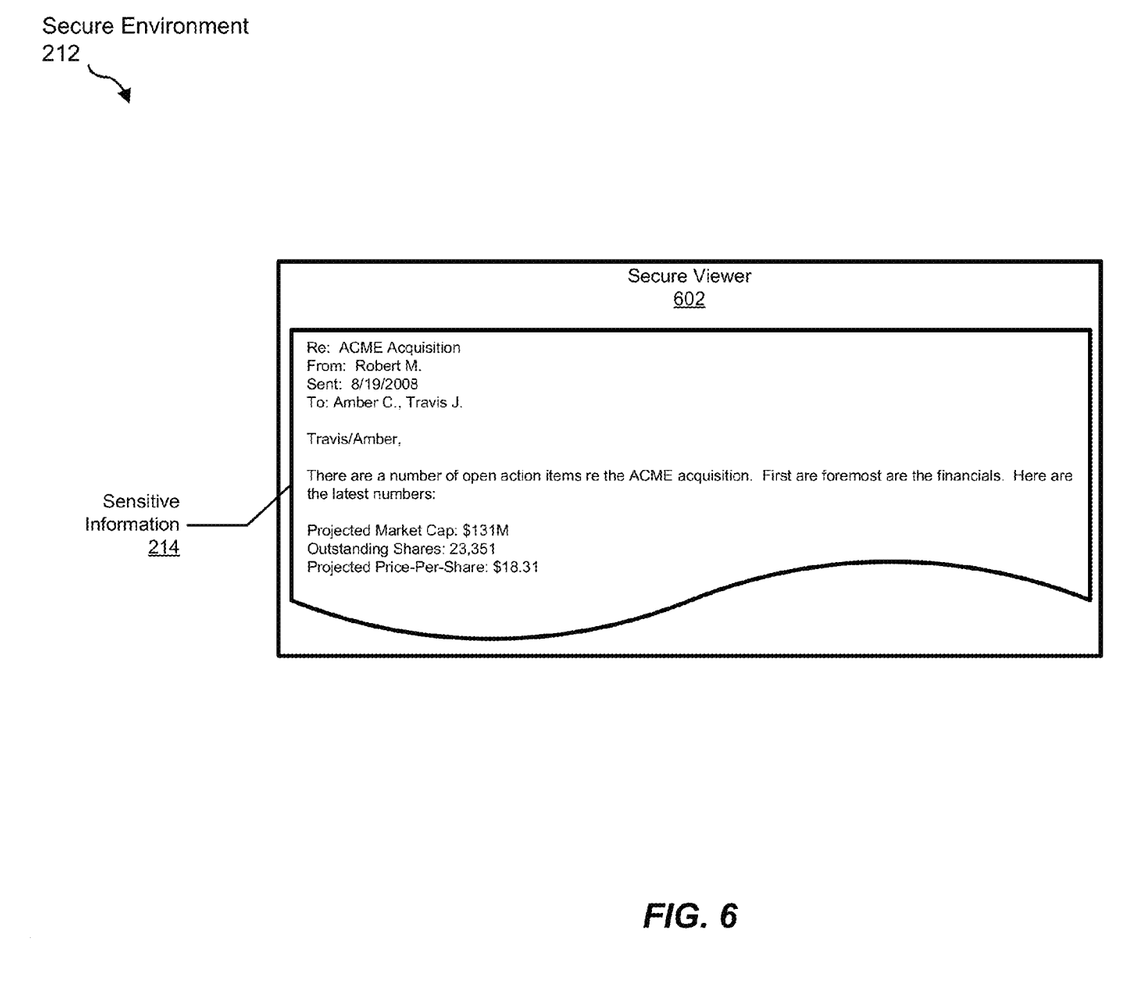
FIG. 6 is an illustration of an exemplary secure environment for viewing and/or editing sensitive information.

The systems described herein may perform step 314 in a variety of ways. In one example, the systems described herein may provide access to the sensitive information by enabling a user and/or application to view and/or edit the sensitive information within or inside of the secure environment. For example, and as illustrated in FIG. 6, secure environment 212 may (using, e.g., various virtualization and/or trusted hardware techniques) provide a secure viewer 602 for securely viewing and/or editing sensitive information 214 within secure environment 212. In this example, secure environment 212 may limit access to sensitive information 214 to within secure viewer 602, thus enabling sensitive information 214 to be safely viewed and/or edited without compromising the security of sensitive information 214.

In one embodiment, the systems described herein may provide access to the sensitive information by transferring from the non-secure environment to the secure environment. For example, access-control module 108 may, upon detecting that a user of computing system 200 has selected reference 204 displayed in non-secure application 402 in FIG. 5, transfer the user from non-secure application 402 in FIG. 5 to secure viewer 602 in FIG. 6, thereby enabling the user to safely view and/or edit sensitive information 214 within secure viewer 602.

In some examples, the systems described herein may vary the amount and type of access granted to the sensitive information based on one or more of characteristics of the request identified in step 310. Examples of the types of characteristics that may be evaluated when determining the level of access to grant in step 314 include, without limitation, temporal characteristics of the request (e.g., whether the request originated during normal business hours), geolocation characteristics of the request (such as whether the request originated from a secure location, such as company property), characteristics of an application responsible for the request (such as whether the request originated from an application that has been verified and/or signed by a trusted vendor), or any other potentially relevant characteristic.

For example, access-control module 108 may provide limited access to sensitive information 214 in FIG. 2 if access-control module 108 determines that computing system 200 is currently located in an unsecure public location (such as an airport). Alternatively, access-control module 108 may provide full or complete access to sensitive information 214 if access-control module 108 determines that computing system 200 is currently located in a secure location (such as company property).

In some examples, the systems described herein may modify (e.g., in real-time) the level and/or type of access provided to the sensitive information based on one or more characteristics of the request identified in step 310. For example, if access-control module 108 detects that computing system 200 has been transported from an unsecure public location (such as an airport) to a secure location (such as company property), then access-control module 108 may increase the level of access granted in step 314 from limited to full. Access-control module 108 may vary or modify access to the sensitive information in any number of increments and/or gradations based on any number and/or combination of relevant characteristics. Upon completion of step 314, exemplary method 300 in FIG. 3 may terminate.

As detailed above, by replacing sensitive information stored within non-secure environments with secure references or pointers to the same, the systems and methods described herein may enable users of non-secure applications (such as mobile applications that cache or store information in plaintext) to securely input sensitive information into (and securely access sensitive information from) such applications without compromising the security of the sensitive information in question.

Figure 7:
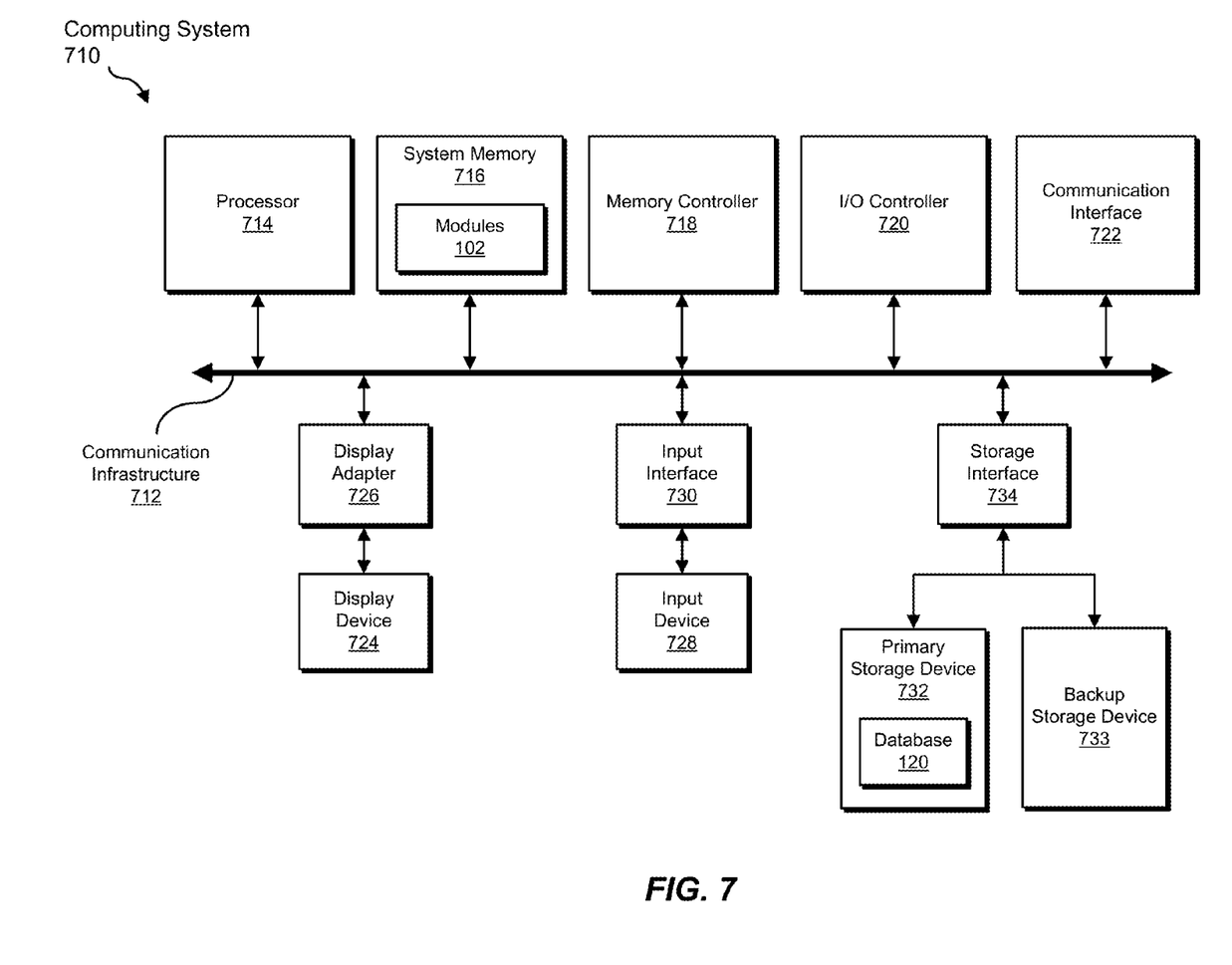
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, removing, storing, replacing, determining, providing, generating, modifying, viewing, and/or editing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, removing, storing, replacing, determining, providing, generating, modifying, viewing, and/or editing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, removing, storing, replacing, determining, providing, generating, modifying, viewing, and/or editing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, removing, storing, replacing, determining, providing, generating, modifying, viewing, and/or editing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, removing, storing, replacing, determining, providing, generating, modifying, viewing, and/or editing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, removing, storing, replacing, determining, providing, generating, modifying, viewing, and/or editing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
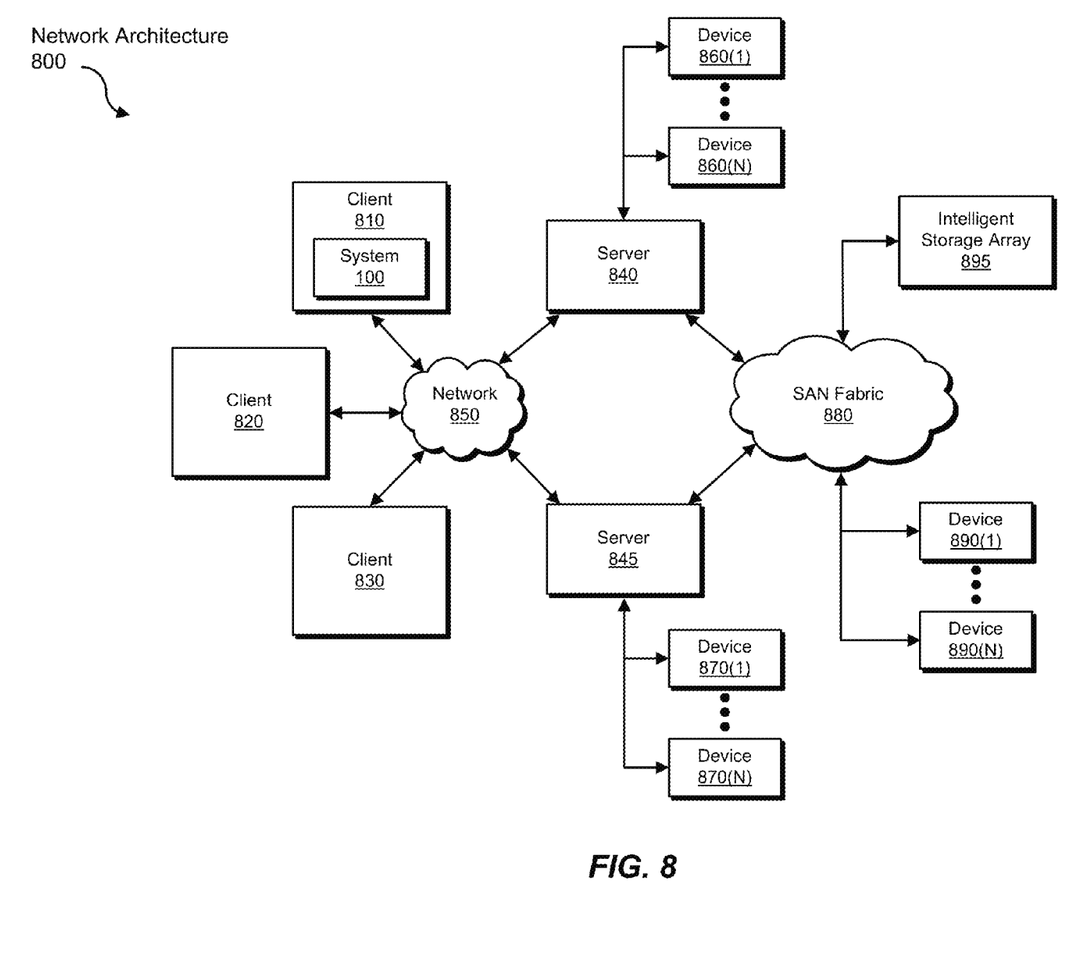
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, removing, storing, replacing, determining, providing, generating, modifying, viewing, and/or editing steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for replacing sensitive information stored within non-secure environments with secure references to the same. In one example, such a method may include (1) identifying sensitive information stored within a non-secure environment on a computing device, (2) removing the sensitive information from the non-secure environment, (3) storing the sensitive information within a secure environment, (4) replacing the sensitive information originally stored within the non-secure environment with a reference that identifies the sensitive information stored within the secure environment, (5) identifying a request to access at least a portion of the sensitive information identified in the reference, (6) determining that at least a portion of the request satisfies a data-loss-prevention policy, and then (7) providing access to at least a portion of the sensitive information via the secure environment.

In some examples, identifying the sensitive information may include determining that at least one characteristic of the sensitive information triggers the data-loss-prevention policy. In addition, replacing the sensitive information originally stored within the non-secure environment with the reference may include automatically generating the reference based on at least one characteristic of the sensitive information in accordance with the data-loss-prevention policy. The method may also include (1) determining that at least one characteristic associated with the sensitive information has changed and then (2) modifying, based on the changed characteristic, the reference in accordance with the data-loss-prevention policy. The reference may identify the sensitive information using text, graphics, and/or colors.

In one example, determining that at least a portion of the request satisfies the data-loss-prevention policy may include determining that at least a portion of the request satisfies criteria relating to a temporal characteristic of the request, an application associated with the request, security credentials associated with the request, and/or geolocation location associated with the request. In this example, the method may also include (1) determining that at least one characteristic associated with the request has changed and then (2) modifying, based on the changed characteristic, the access provided to the sensitive information via the secure environment in accordance with the data-loss-prevention policy.

In some embodiments, providing access to at least a portion of the sensitive information via the secure environment may include enabling viewing and/or editing the sensitive information via the secure environment. In one example, the computing device may include a mobile computing device and the non-secure environment may include a native application on the mobile computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 in FIG. 1 may transform a mobile computing device into a device capable of providing secure access to sensitive information input into, or viewed or accessed by, non-secure applications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for replacing sensitive information stored within non-secure applications with secure references to the sensitive information, at least a portion of the method being performed by a computing device comprising at least one processor, the method comprising:
   identifying sensitive information stored within a non-secure application that fails to protect the sensitive information from illegitimate access;
   protecting the sensitive information by:
      removing the sensitive information from the non-secure application;
      storing the sensitive information within a secure application that protects the sensitive information from illegitimate access;
      replacing the sensitive information originally stored within the non-secure application with a non-sensitive description of the sensitive information that points to the sensitive information stored within the secure application;
   identifying a request by a user to access at least a portion of the sensitive information identified in the non-sensitive description;
   determining that at least a portion of the request satisfies a data-loss-prevention policy;
   upon determining that at least a portion of the request satisfies the data-loss-prevention policy, transferring the user from a window frame displaying the non-secure application to a window frame displaying the secure application to provide access to at least a portion of the sensitive information via the window frame of the secure application.

2. The method of claim 1, wherein identifying the sensitive information comprises determining that at least one characteristic of the sensitive information triggers the data-loss-prevention policy.

3. The method of claim 1, wherein replacing the sensitive information originally stored within the non-secure environment with the non-sensitive description of the sensitive information comprises automatically generating the non-sensitive description based on at least one characteristic of the sensitive information in accordance with the data-loss-prevention policy.

4. The method of claim 3, further comprising:
   determining that the characteristic associated with the sensitive information has changed;
   modifying, based on the changed characteristic, the non-sensitive description in accordance with the data-loss-prevention policy.

5. The method of claim 1, wherein the non-sensitive description identifies the sensitive information using at least one of:
   text;
   graphics;
   colors.

6. The method of claim 1, wherein determining that at least a portion of the request satisfies the data-loss-prevention policy comprises determining that at least a portion of the request satisfies criteria relating to at least one of:
   a temporal characteristic of the request;
   an application associated with the request;
   security credentials associated with the request;
   geolocation information associated with the request.

7. The method of claim 6, further comprising:
   determining that at least one characteristic associated with the request has changed;
   modifying, based on the changed characteristic, the access provided to the sensitive information via the secure application in accordance with the data-loss-prevention policy.

8. The method of claim 1, wherein:
   the non-sensitive description comprises a pointer that points to the sensitive information stored within the secure application;
   identifying the request by the user to access the sensitive information comprises detecting that the user has selected the pointer.

9. The method of claim 1, wherein the computing device comprises a mobile computing device and the non-secure application comprises a native application on the mobile computing device.

10. A system for replacing sensitive information stored within non-secure applications with secure references to the sensitive information, the system comprising:
- a culling module that:
  - identifies sensitive information stored within a non-secure application that fails to protect the sensitive information from illegitimate access;
  - protects the sensitive information by:
    - removing the sensitive information from the non-secure application;
    - storing the sensitive information within a secure application that protects the sensitive information from illegitimate access;
- a reference-creation module that replaces the sensitive information originally stored within the non-secure application with a non-sensitive description of the sensitive information that points to the sensitive information stored within the secure application;
- an access-control module that:
  - identifies a request by a user to access at least a portion of the sensitive information identified in the non-sensitive description;
  - determines that at least a portion of the request satisfies a data-loss-prevention policy;
  - upon determining that at least a portion of the request satisfies the data-loss-prevention policy, transfers the user from a window frame displaying the non-secure application to a window frame displaying the secure application to provide access to at least a portion of the sensitive information via the secure application;
- at least one hardware processor configured to execute the culling module, the reference-creation module, and the access-control module.

11. The system of claim 10, wherein the culling module identifies the sensitive information by determining that at least one characteristic of the sensitive information triggers the data-loss-prevention policy.

12. The system of claim 10, wherein the reference-creation module replaces the sensitive information originally stored within the non-secure application with the non-sensitive description of the sensitive information by automatically generating the non-sensitive description based on at least one characteristic of the sensitive information in accordance with the data-loss-prevention policy.

13. The system of claim 12, wherein the reference-creation module further:
- determines that the characteristic associated with the sensitive information has changed;
- modifies, based on the changed characteristic, the non-sensitive description in accordance with the data-loss-prevention policy.

14. The system of claim 10, wherein the non-sensitive description identifies the sensitive information using at least one of:
- text;
- graphics;
- colors.

15. The system of claim 10, wherein the access-control module determines that at least a portion of the request satisfies the data-loss-prevention policy by determining that at least a portion of the request satisfies criteria relating to at least one of:
- a temporal characteristic of the request;
- an application associated with the request;
- security credentials associated with the request;
- geolocation information associated with the request.

16. The system of claim 15, wherein the access-control module further:
- determines that at least one characteristic associated with the request has changed;
- modifies, based on the changed characteristic, the access provided to the sensitive information via the secure application in accordance with the data-loss-prevention policy.

17. The system of claim 10, wherein:
- the non-sensitive description comprises a pointer that points to the sensitive information stored within the secure application;
- the access-control module identifies the request by the user to access the sensitive information by detecting that the user has selected the pointer.

18. The system of claim 10, wherein the non-sensitive application comprises a mobile application on a mobile computing device.

19. A non-transitory computer-readable-storage medium comprising one or more computer-executable instructions that, when executed by at least one processor of a computing device, cause the computing device to:
- identify sensitive information stored within a non-secure application that fails to protect the sensitive information from illegitimate access;
- protect the sensitive information by:
  - removing the sensitive information from the non-secure application;
  - storing the sensitive information within a secure application that protects the sensitive information from illegitimate access;
- replace the sensitive information originally stored within the non-secure application with a non-sensitive description of the sensitive information that points to the sensitive information stored within the secure application;
- identify a request by a user to access at least a portion of the sensitive information identified in the non-sensitive description;
- determine that at least a portion of the request satisfies a data-loss-prevention policy;
- upon determining that at least a portion of the request satisfies the data-loss-prevention policy, transfer the user from a window frame displaying the non-secure application to a window frame displaying the secure application to provide access to at least a portion of the sensitive information via the secure application.

20. The non-transitory computer-readable-storage medium of claim 19, wherein the computer-executable instructions, when executed by the processor of the computing device, further cause the computing device to:
- determine that at least one characteristic associated with the request has changed;
- modify, based on the changed characteristic, the access provided to the sensitive information via the secure application in accordance with the data-loss-prevention policy.

* * * * *